US012575538B1

(12) United States Patent
Angelucci

(10) Patent No.: US 12,575,538 B1
(45) Date of Patent: Mar. 17, 2026

(54) PET WASTE MANAGEMENT DEVICE AND METHOD OF USE

(71) Applicant: Karen Angelucci, Lexington, KY (US)

(72) Inventor: Karen Angelucci, Lexington, KY (US)

( * ) Notice: Subject to any disclaimer, the term of this patent is extended or adjusted under 35 U.S.C. 154(b) by 0 days.

(21) Appl. No.: 18/946,042

(22) Filed: Nov. 13, 2024

(51) Int. Cl.
*A01K 1/01* (2006.01)

(52) U.S. Cl.
CPC ............ *A01K 1/0107* (2013.01); *A01K 1/011* (2013.01)

(58) Field of Classification Search
CPC .............................. A01K 1/0107; A01K 1/011
See application file for complete search history.

(56) References Cited

U.S. PATENT DOCUMENTS

| | | | | |
|---|---|---|---|---|
| 3,752,121 A | * | 8/1973 | Brazzell | A01K 1/0107 |
| | | | | 119/169 |
| 4,869,204 A | * | 9/1989 | Yananton | A01K 1/0107 |
| | | | | 119/169 |
| 5,482,007 A | * | 1/1996 | Kumlin | A01K 1/0107 |
| | | | | 119/169 |
| 7,249,570 B1 | * | 7/2007 | Roberson | A01K 1/0157 |
| | | | | 119/169 |
| 11,382,304 B2 | | 7/2022 | Partlow | |
| D975,940 S | | 1/2023 | Grant | |
| 2010/0307422 A1 | * | 12/2010 | Huck | A01K 1/0107 |
| | | | | 600/584 |
| 2018/0183002 A1 | | 6/2018 | Kawata | |
| 2019/0239483 A1 | | 8/2019 | Thibault | |
| 2021/0100215 A1 | | 4/2021 | Phelps | |
| 2021/0169038 A1 | | 6/2021 | Okawa | |
| 2023/0054322 A1 | | 2/2023 | Taylor | |
| 2023/0078871 A1 | * | 3/2023 | Kaminski | A01K 1/0114 |
| | | | | 119/167 |

FOREIGN PATENT DOCUMENTS

| | | |
|---|---|---|
| WO | WO2023022196 | 2/2023 |
| WO | 20240188531 | 6/2024 |

* cited by examiner

*Primary Examiner* — Michael H Wang

(57) ABSTRACT

A pet waste management device for hygienic litter-free management of pet waste includes a mat, which is positionable in a litter box. The mat comprises a panel, which has upper and a lower faces and a perimeter. The panel substantially covers a bottom of the litter box and is impermeable to liquid bodily waste that is excreted by a pet. A pad is attached to the upper face of the panel. The pad is absorbent and thus absorbs the liquid bodily waste. A plurality of fibers is attached to the panel and extends through the pad. The plurality of fibers provides excretion promoting tactile sensations to the pet. The mat thus absorbs the liquid bodily waste and collects solid bodily waste, positioning a user to remove the mat from the litter box, to dispose of the solid bodily waste, and to launder the mat prior to reuse.

5 Claims, 11 Drawing Sheets

PET WASTE MANAGEMENT DEVICE AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR Not Applicable

BACKGROUND OF THE INVENTION

(1) Field of the Invention

The disclosure relates to waste management devices and more particularly pertains to a new waste management device for hygienic litter-free management of pet waste. Typically, pet waste management indoors entails use of a system comprising litter and a litter box. Such systems suffer from a wide range of deficiencies, such as, but not limited to, dealing with litter bags having large mass, handling and disposal of soiled litter, smells, leakage, residue and dust, and the like. A new waste management device that allows for hygienic management of pet waste would be of benefit to pet owners, particularly those who own cats. In particular, a new waste management device that does not utilize litter would eliminate this cost and the resultant landfill waste that is produced.

(2) Description of Related Art Including Information Disclosed Under 37 CFR 1.97 and 1.98

The prior art relates to waste management devices, which may comprise pads or liners that are absorbent but which cannot be laundered. These waste management devices do not comprise a plurality of fibers to provide excretion promoting tactile sensations to a pet positioned on the pad or liner.

BRIEF SUMMARY OF THE INVENTION

An embodiment of the disclosure meets the needs presented above by generally comprising a mat, which is configured to be positioned in a litter box. The mat comprises a panel, which has an upper face, a lower face, and a perimeter and which is configured to substantially cover a bottom of the litter box. The panel is impermeable to liquid bodily waste that is excreted by a pet. A pad is attached to the upper face of the panel. The pad is absorbent and thus is configured to absorb the liquid bodily waste. A plurality of fibers is attached to the panel and extends through the pad. The plurality of fibers is configured to provide excretion promoting tactile sensations to the pet. The mat is configured to absorb the liquid bodily waste and to collect solid bodily waste, positioning a user to remove the mat from the litter box, to dispose of the solid bodily waste, and to launder the mat prior to reuse.

Another embodiment of the disclosure includes a pet waste management system, which comprises a litter box and a pet waste management device comprising a mat, as per the disclosure above. The litter box has a bottom, a top, which is open, and a sidewall that extends from the bottom to the top. The panel of the mat can selectively and substantially cover the bottom of the litter box. The mat is configured to absorb the liquid bodily waste and to collect the solid bodily waste, positioning a user to remove the mat from the litter box, to dispose of the solid bodily waste, and to launder the mat prior to reuse.

Yet another embodiment of the disclosure includes a litter-free method of managing pet waste. The method entails provision of a litter box and a pet waste management device, as per the disclosure above. Steps of the method include positioning the mat in the litter box so that the bottom of the litter box is substantially covered, allowing the pet to urinate and defecate, removing the mat, disposing of the solid bodily waste, laundering the mat, and repositioning the mat in the litter box.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
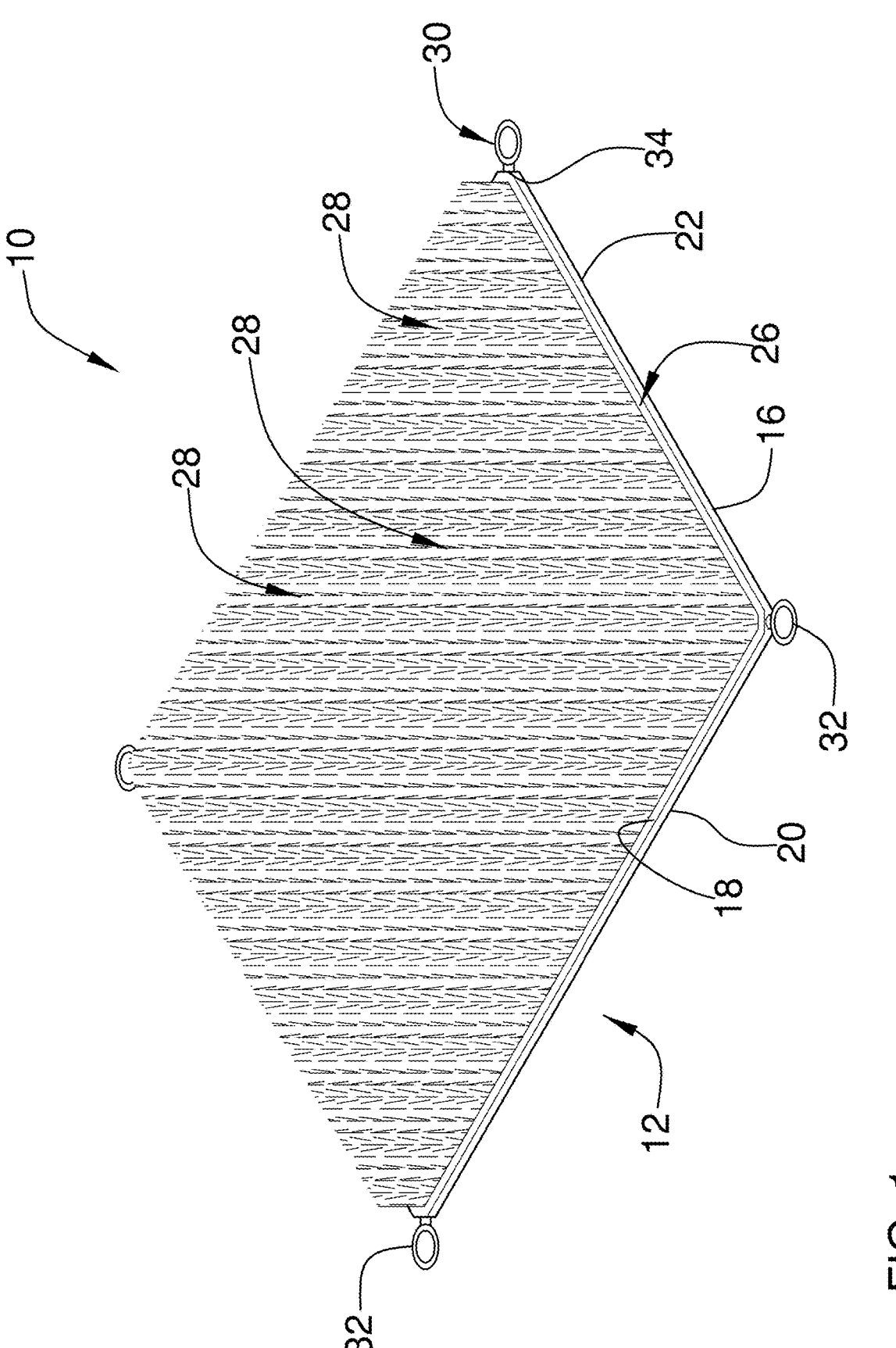
FIG. 1 is an isometric perspective view of a pet waste management device according to an embodiment of the disclosure.

With reference now to the drawings, and in particular to FIGS. 1 through 11 thereof, a new waste management device embodying the principles and concepts of an embodiment of the disclosure and generally designated by the reference numeral 10 will be described.

As best illustrated in FIGS. 1 through 11, the pet waste management device 10 generally comprises a mat 12, which is configured to be positioned in a litter box 14. The mat 12 comprises a panel 16, which has an upper face 18, a lower face 20, and a perimeter 22 and which is configured to substantially cover a bottom 24 of the litter box 14. The panel 16 is impermeable to liquid bodily waste that is excreted by a pet. A pad 26 is attached to the upper face 18 of the panel 16. The pad 26 is absorbent and thus is configured to absorb the liquid bodily waste. A plurality of fibers 28 is attached to the panel 16 and extends through the pad 26. The plurality of fibers 28 is configured to provide excretion promoting tactile sensations to the pet. The mat 12 is configured to absorb the liquid bodily waste and to collect solid bodily waste, positioning a user to remove the mat 12 from the litter box 14, to dispose of the solid bodily waste, and to launder the mat 12 prior to reuse.

Figure 2:
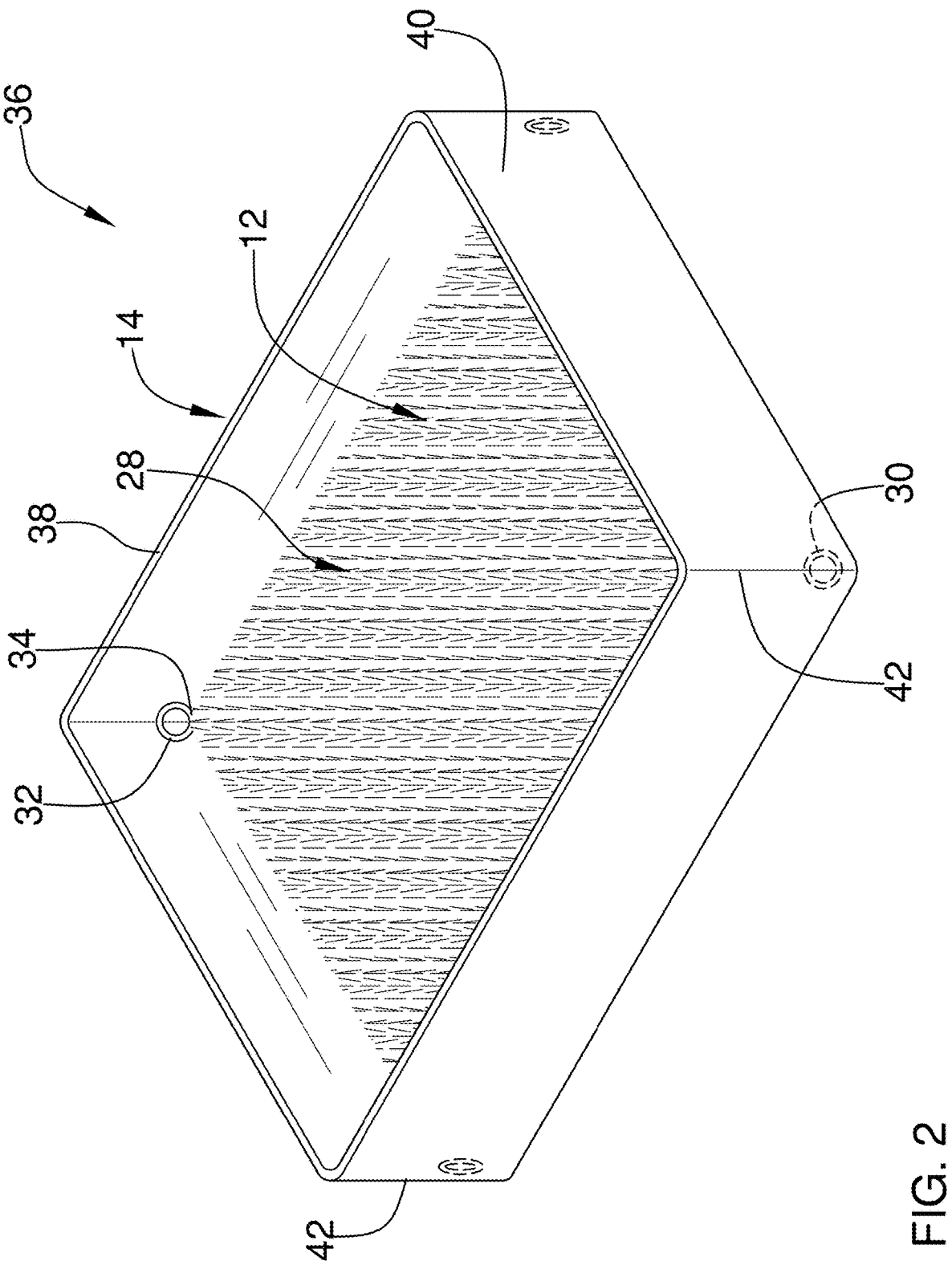
FIG. 2 is an in-use view of an embodiment of the disclosure.
Figure 3:
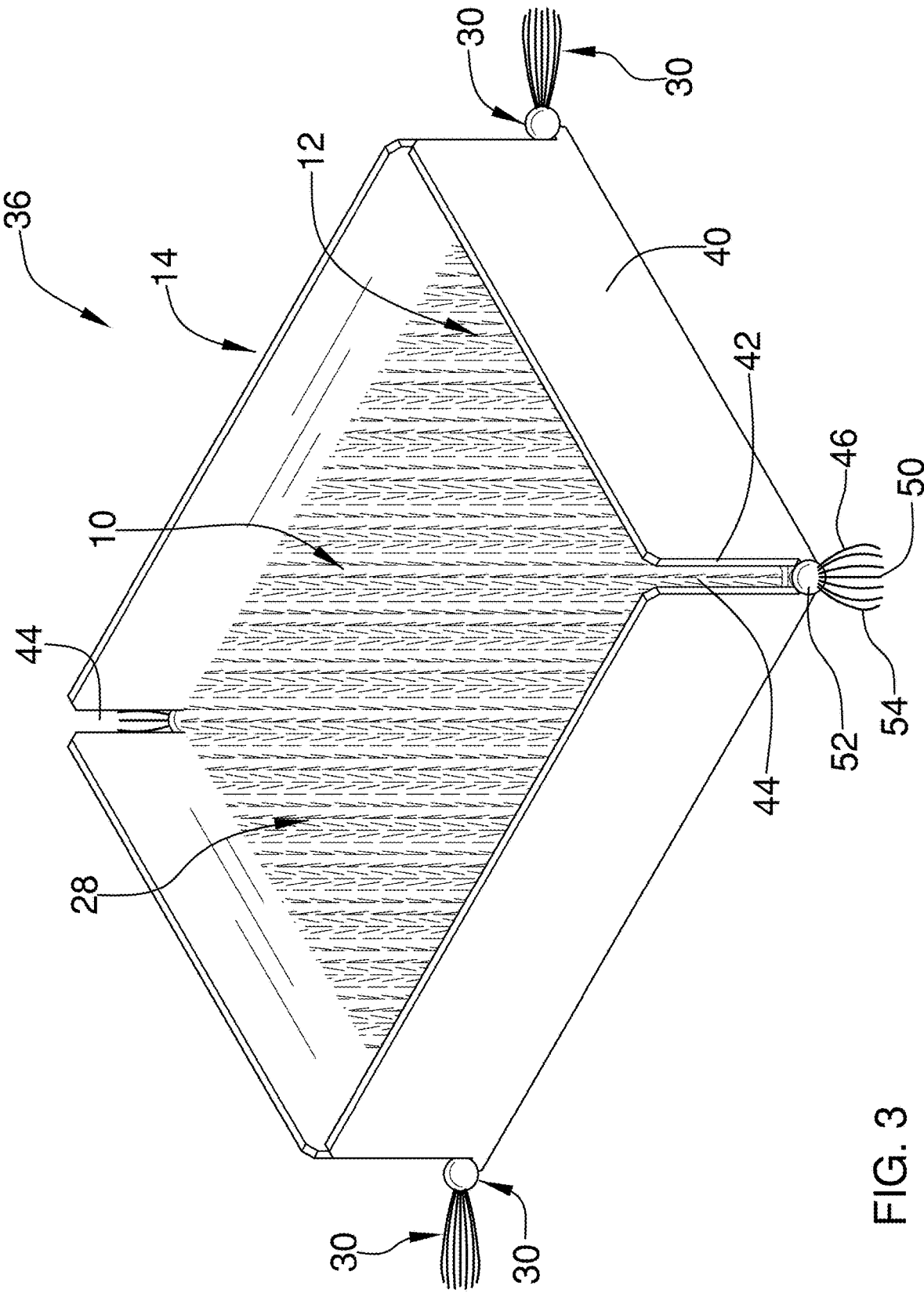
FIG. 3 is an isometric perspective view of an embodiment of the disclosure.
Figure 4:
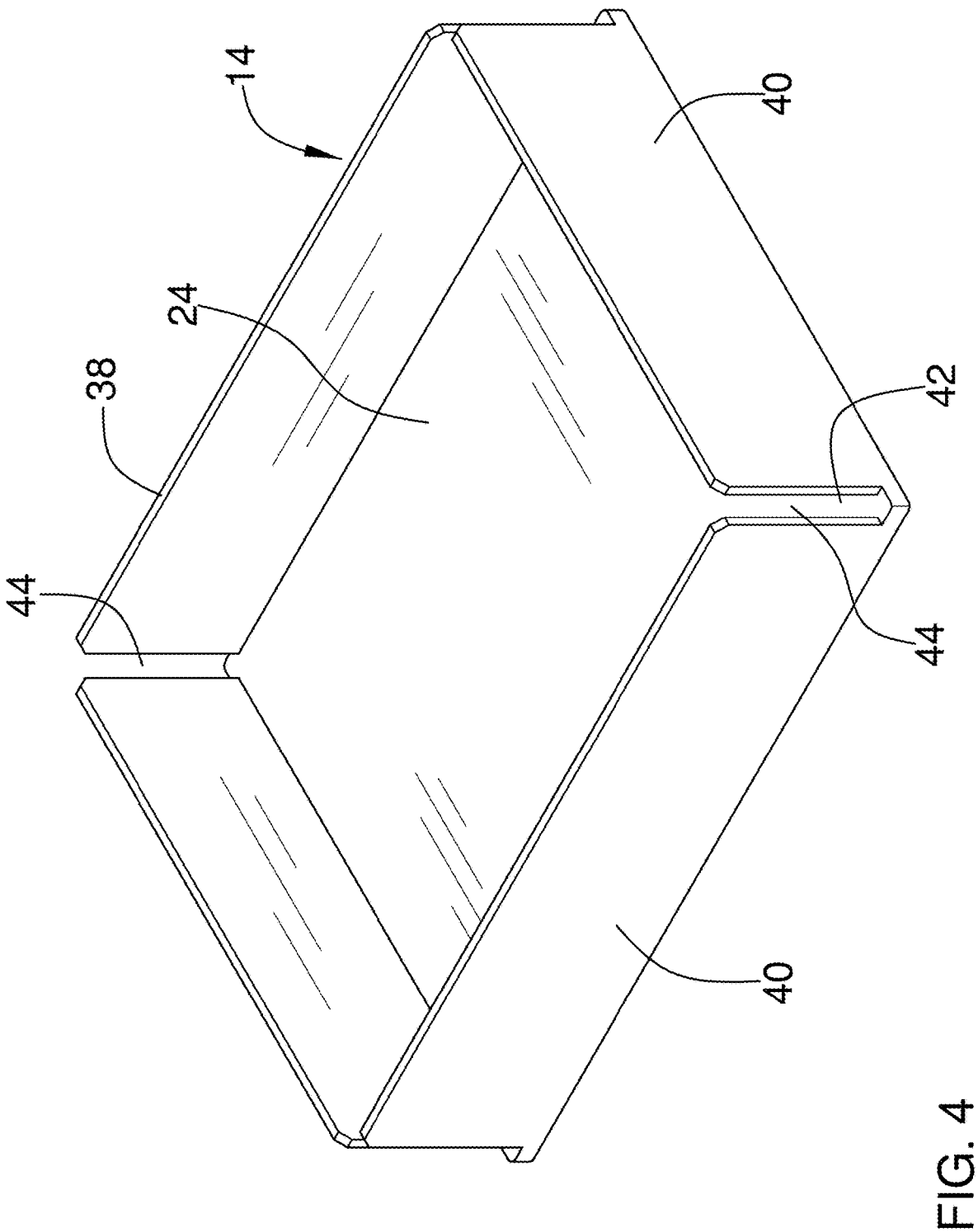
FIG. 4 is an isometric perspective view of an embodiment of the disclosure.

A grip 30 is attached to the panel 16 proximate to the perimeter 22 of the panel 16 and is configured to be grasped in digits of a hand of a user to remove the mat 12 from the litter box 14. As is shown in FIGS. 1 and 2, the grip 30 comprises a ring 32 that is configured for insertion of a digit of the hand of the user. The grip 30 may comprise other grasping means, such as, but not limited to, ropes, knobs, or the like.

As is shown in FIG. 1, the panel 16 is rectangular and has corners 34. The present invention anticipates the panel 16 be alternatively shaped, such as, but not limited to, circular, ovoid, or the like, and being complementarily sized and shaped to the bottom 24 of a respective litter box 14. Also as shown in FIG. 1, the grip 30 is one of a plurality of grips 30, with each grip 30 being attached to the panel 16 proximate to a respective corner 34 of the panel 16 so that each corner 34 has a grip 30 attached proximate thereto. The four grips 30 allow the user to sequentially lift the corners 34 to gather them together to prevent spillage of the bodily waste during removal of the mat 12 from the litter box 14.

The fibers 28 of the plurality of fiber may comprise cotton, bamboo, microfibers, or the like and so that they are absorbent and so that the plurality of fibers 28 is configured to absorb the liquid bodily waste. The panel 16 comprises elastomer that is free of openings while the pad 26 comprises fabric, sponge, foamed elastomer, or the like. The mat 12 thus is configured to be laundered.

The present invention also anticipates a pet waste management system 36, as is shown in FIGS. 3-10. The pet waste management system 36 comprises a litter box 14 and a pet waste management device 10 comprising a mat 12, as per the specification above. The litter box 14 has a bottom 24, a top 38 that is open, and a sidewall 40 that extends from the bottom 24 to the top 38. The panel 16 of the mat 12 can selectively and substantially cover the bottom 24 of the litter box 14. The mat 12 is configured to absorb the liquid bodily waste and to collect the solid bodily waste, positioning a user to remove the mat 12 from the litter box 14, to dispose of the solid bodily waste, and to launder the mat 12 prior to reuse.

Figure 5:
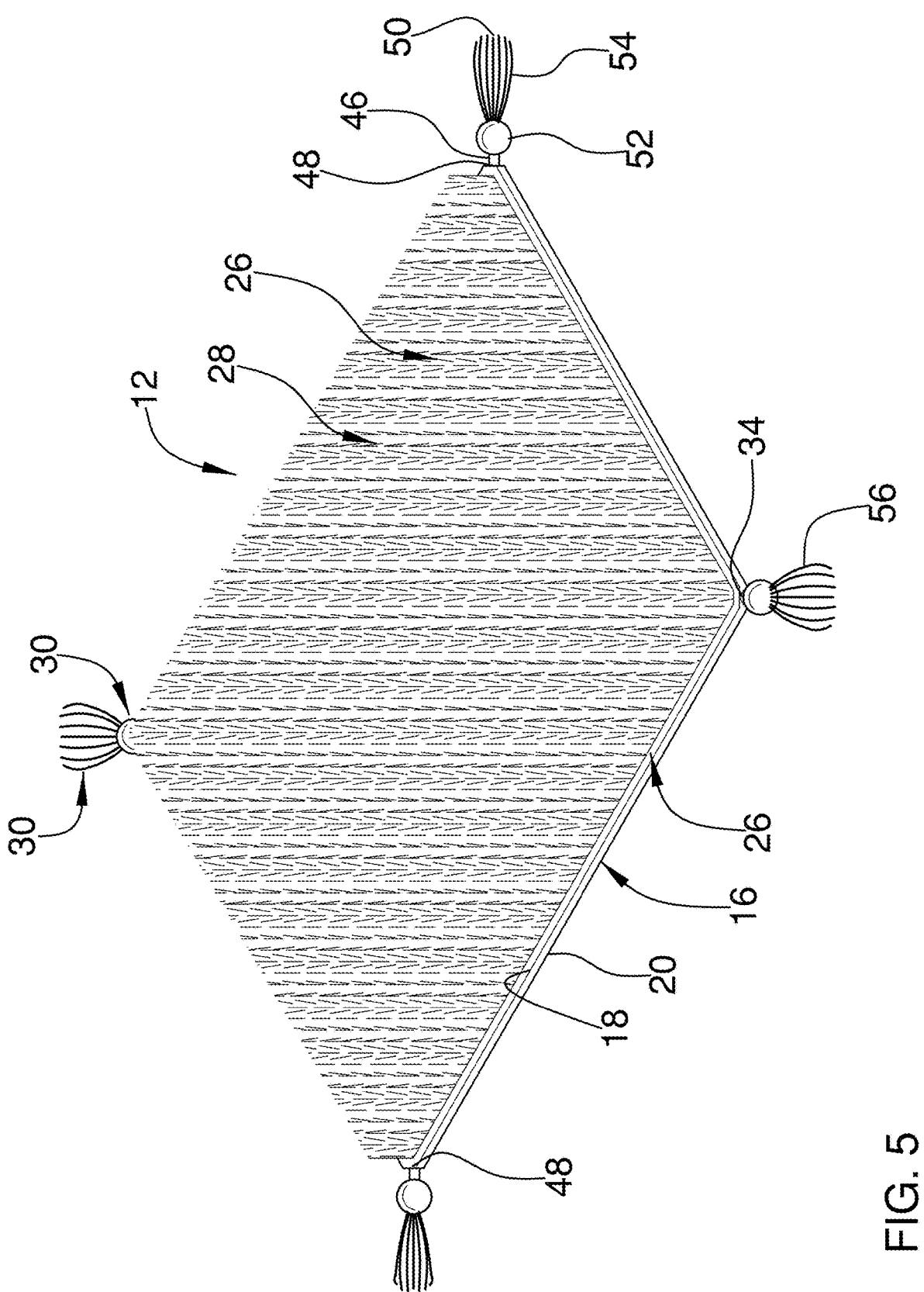
FIG. 5 is an isometric perspective view of an embodiment of the disclosure.
Figure 6:
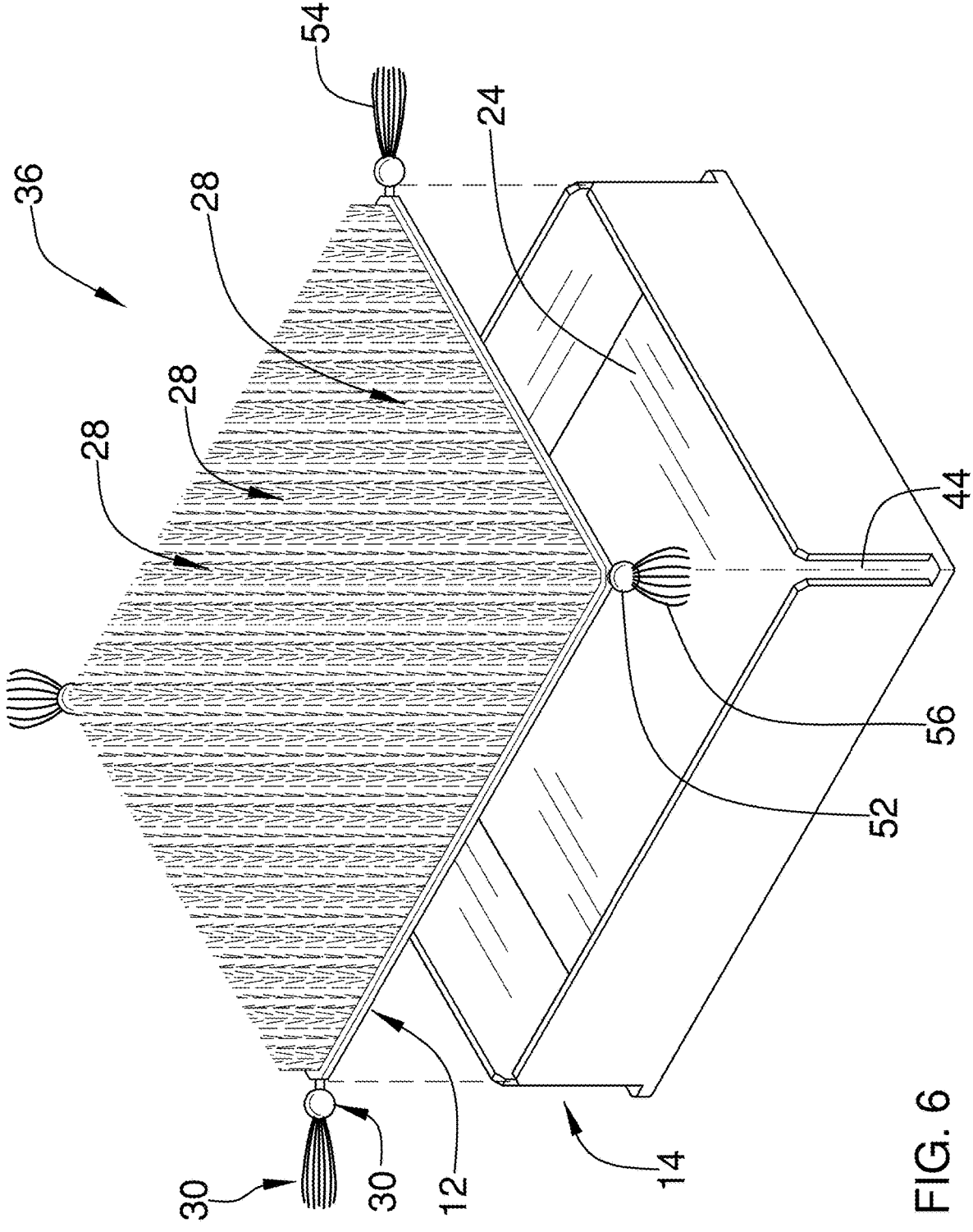
FIG. 6 is an exploded view of an embodiment of the disclosure.
Figure 7:
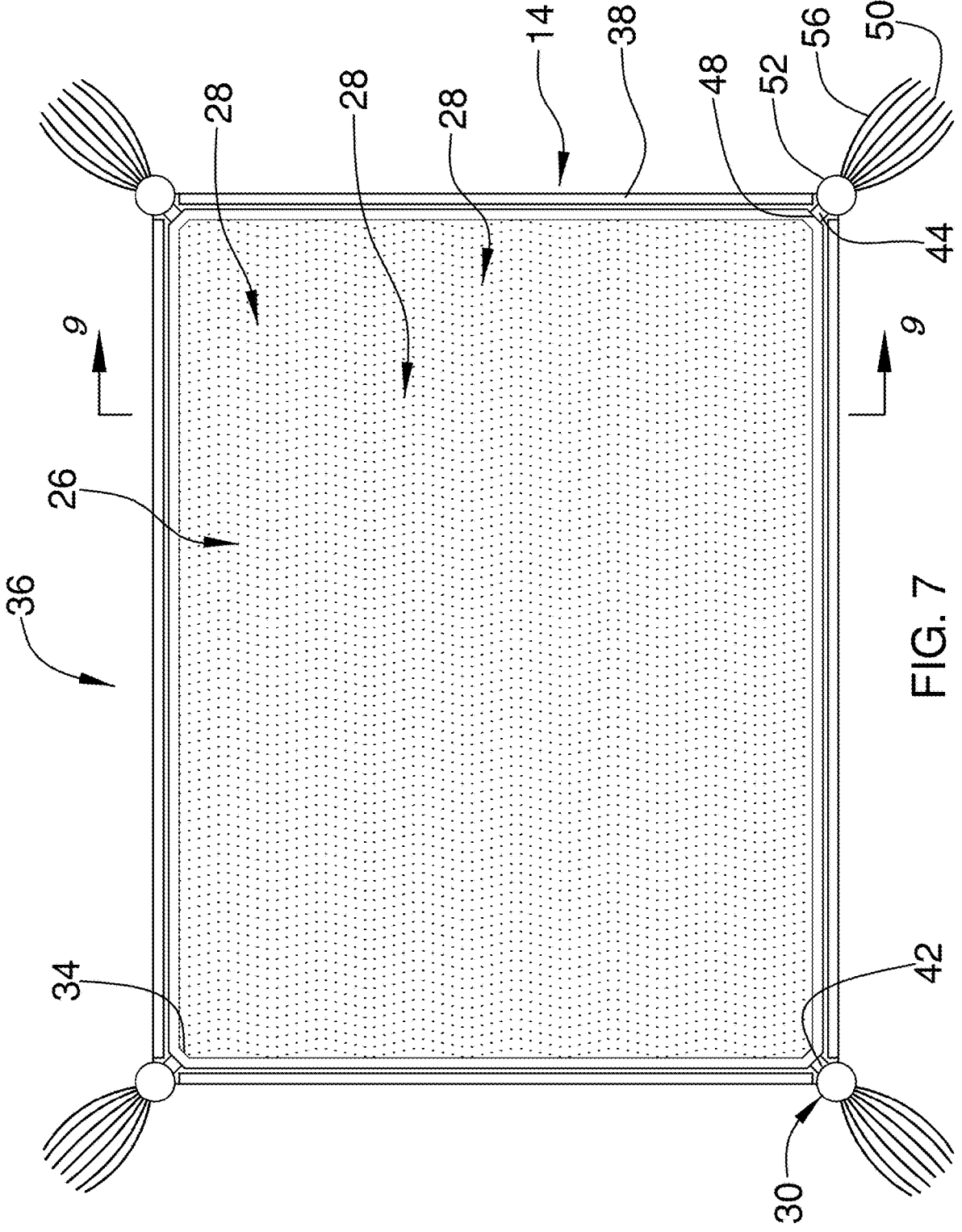
FIG. 7 is a top view of an embodiment of the disclosure.
Figure 8:
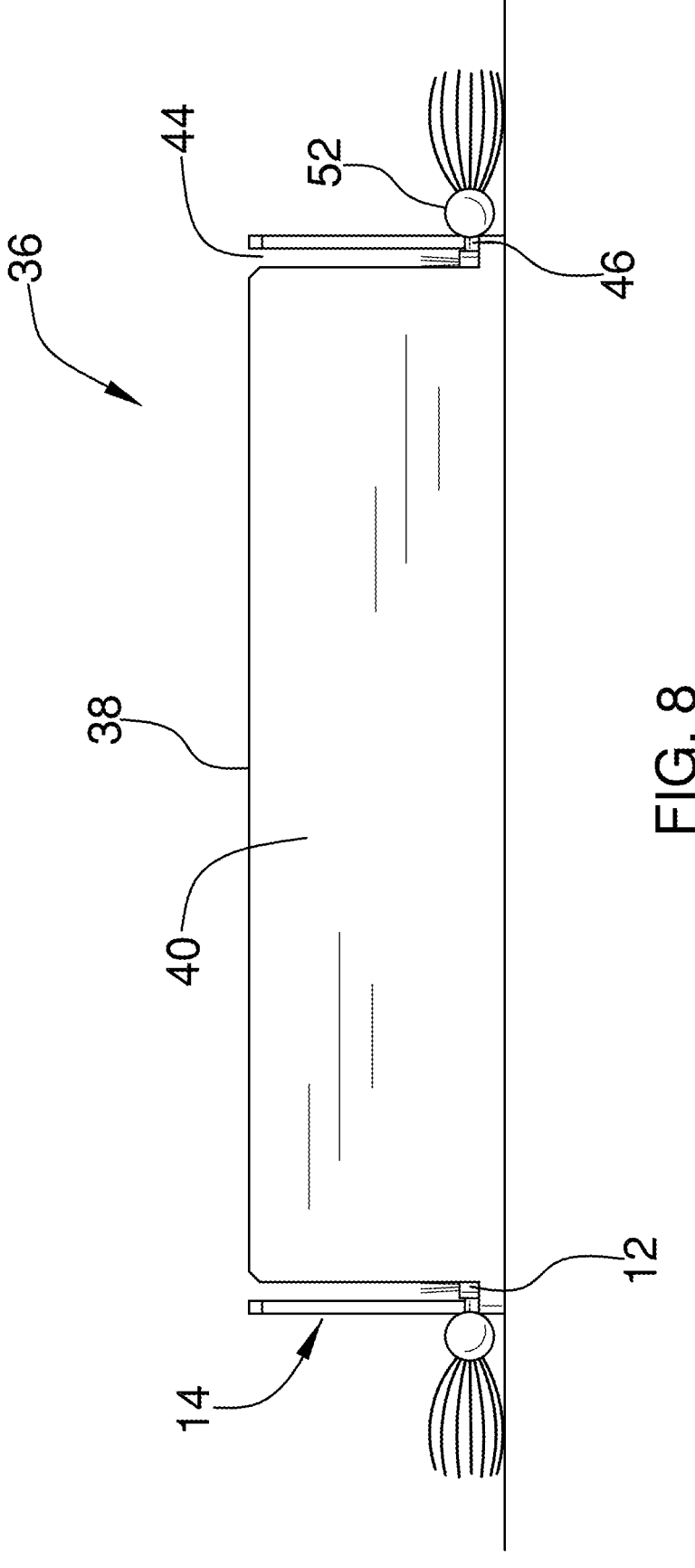
FIG. 8 is a side view of an embodiment of the disclosure.
Figure 9:
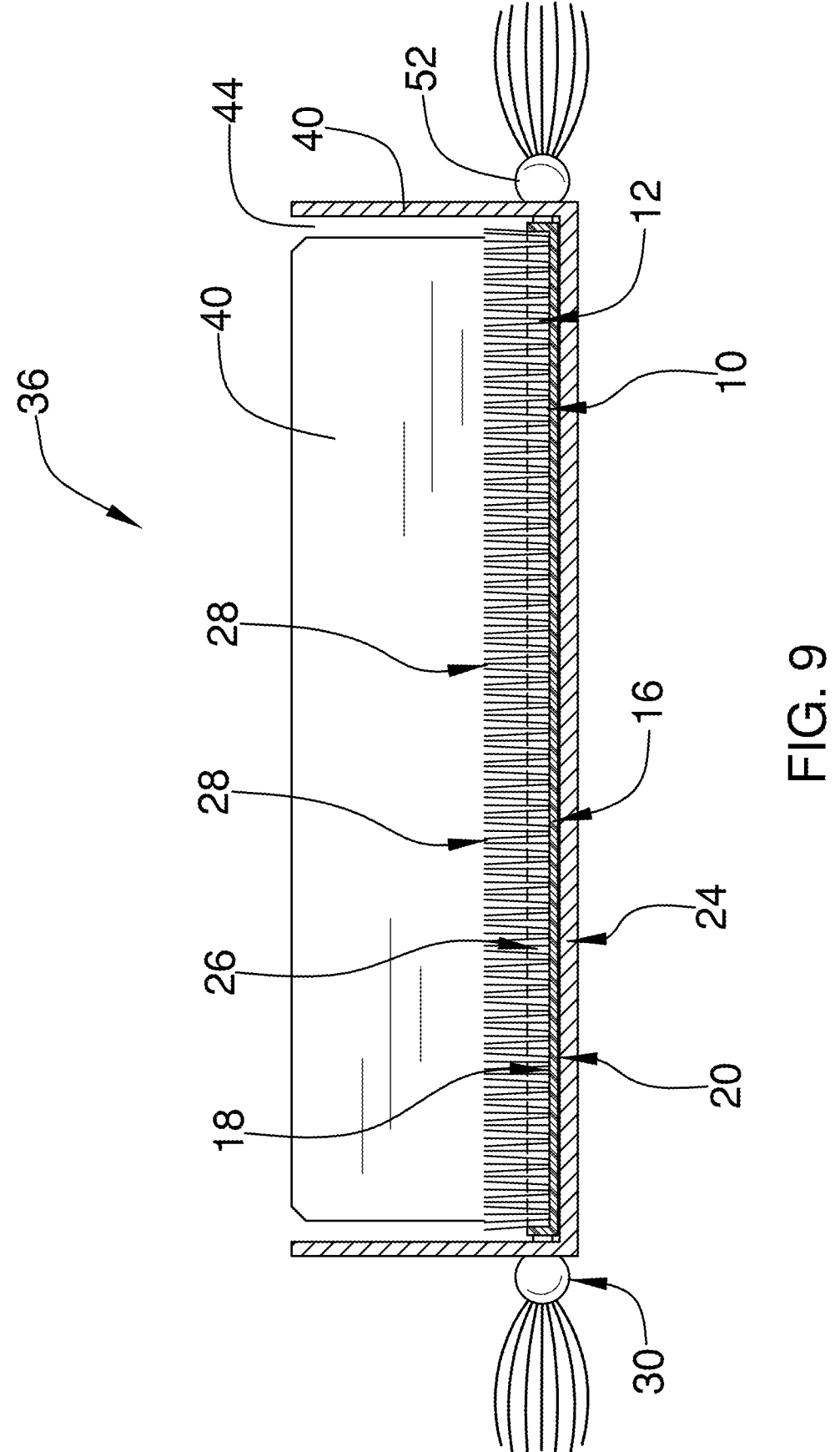
FIG. 9 is a cross-sectional view of an embodiment of the disclosure.
Figure 10:
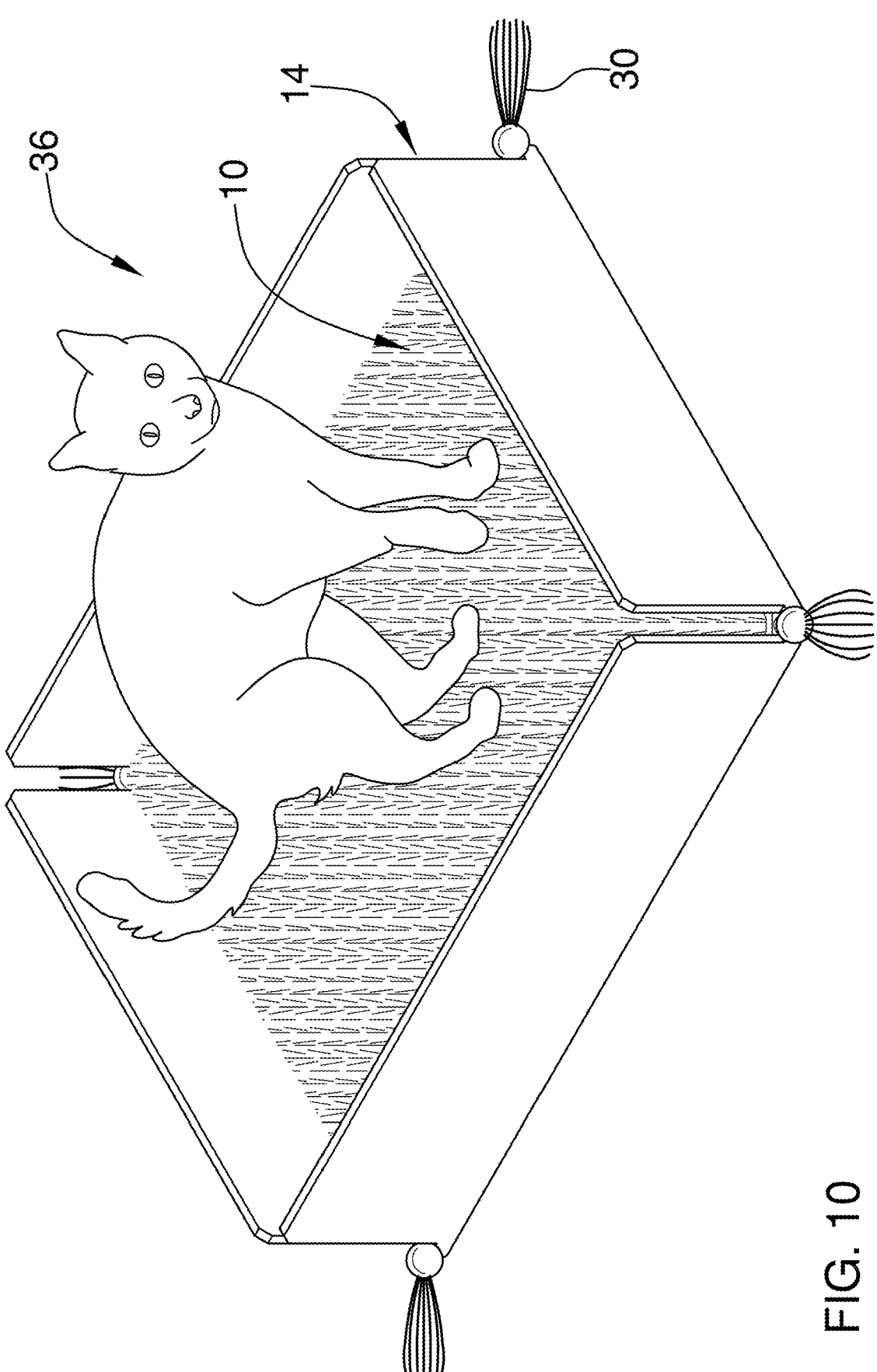
FIG. 10 is an in-use view of an embodiment of the disclosure.
Figure 11:
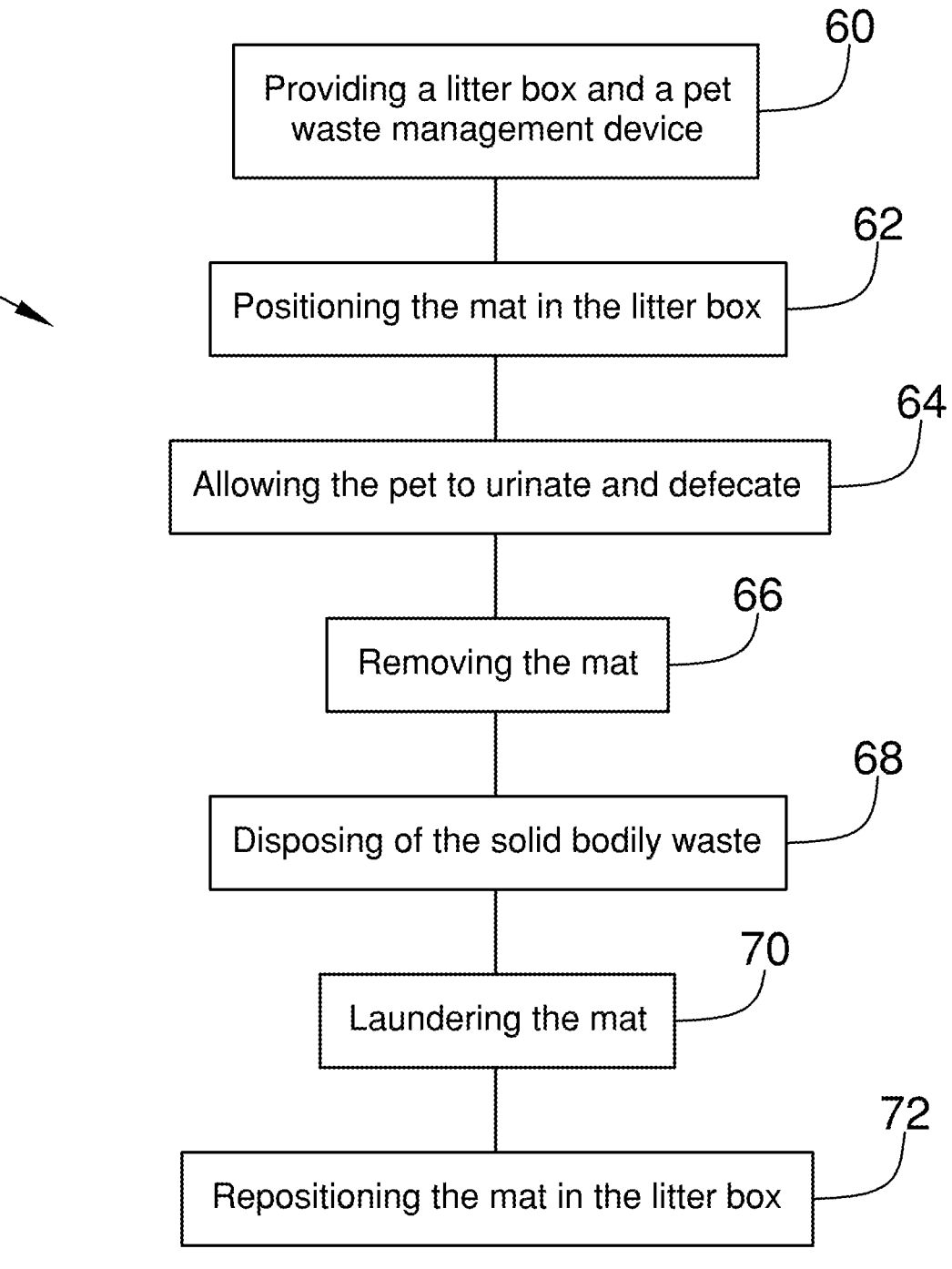
FIG. 11 is a flow diagram for a method utilizing an embodiment of the disclosure.

As is shown in FIGS. 2-4 and 6-10, the litter box 14 is cuboid and the sidewall 40 defines four side edges 42. Each slot 44 of a plurality of slots 44 extends upwardly into a respective side edge 42 of the sidewall 40 from proximate to the bottom 24 to the top 38 of the litter box 14. As is shown in FIG. 5, the panel 16 is rectangular and has corners 34 and the grip 30 is one of a plurality of grips 30. Each grip 30 is attached to the panel 16 proximate to a respective corner 34 of the panel 16 so that each corner 34 has a grip 30 attached proximate thereto. The shapes of the litter box 14 and the panel 16 need not be cuboid and rectangular but rather are only required to be complementary. For example, a panel 16 that is circular would complement a litter box 14 that is cylindrical.

Each grip 30 may comprise a rope 46 having a first end 48 and a second end 50, with the first end 48 being attached to the panel 16. The rope 46 is extensible through a respective slot 44. A knob 52 is attached to the rope 46 and spaced from the first end 48 so that the knob 52 is positioned externally to the litter box 14 upon positioning of the mat 12 in the litter box 14. The knob 52 serves to hold the mat 12 in place within the litter box 14. The knob 52 and the second end 50 of the rope 46 define a terminal section 54 of the rope. As is shown in the figures, the terminal section 54 comprises a tassel 56, which is both functional, in that is can be grasped to raise and lower the mat 12, and decorative.

In use, the pet waste management device 10 enables a litter-free method of managing pet waste 58. The method 58 comprises a first step 60 of providing a litter box 14 and a pet waste management device 10, as per the specification above. A second step 62 of the method 58 is positioning the mat 12 in the litter box 14 so that the bottom 24 of the litter box 14 is substantially covered. A third step 64 of the method 58 is allowing the pet to urinate and defecate. A fourth step 66 of the method 58 is removing the mat 12. A fifth step 68 of the method 58 is disposing of the solid bodily waste. A sixth step 70 of the method 58 is laundering 32 the mat 12. A seventh step 72 of the method 58 is repositioning the mat 12 in the litter box 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pet waste management system comprising:

a litter box having a bottom, a top, and a sidewall extending from the bottom to the top, the top being open; and a pet waste management device comprising a mat, the mat comprising:

a panel having an upper face, a lower face, and a perimeter, the panel selectively and substantially covering the bottom of the litter box, the panel being impermeable to liquid bodily waste excreted by a pet;

a pad being attached to the upper face of the panel, the pad being absorbent wherein the pad is configured for absorbing the liquid bodily waste excreted by the pet;

a plurality of fibers being attached to the panel and extending through the pad, wherein the plurality of fibers is configured for providing excretion promoting tactile sensations to the pet; and wherein the mat is configured for absorbing the liquid bodily waste and for collecting solid bodily waste, positioning a user to remove the mat from the litter box, to dispose of the solid bodily waste, and to launder the mat prior to reuse;

the litter box is cuboid and the sidewall defines four side edges;

the panel being rectangular and having corners;

a grip being attached to the panel proximate to the perimeter of the panel, wherein the grip is configured for being grasped in digits of a hand of a user for removing the mat from the litter box, the grip being one of a plurality of grips, each grip being attached to the panel proximate to a respective corner of the panel such that each corner has a grip attached proximate thereto;

the fibers of the plurality of fibers being absorbent, wherein the plurality of fibers is configured for the absorbing liquid bodily waste;

the panel comprising elastomer free of openings, the pad comprising fabric, sponge, or foamed elastomer, the plurality of fibers comprising cotton, bamboo, or microfibers, wherein the mat is configured for being laundered;

a plurality of slots, each slot extending upwardly into a respective side edge of the sidewall from proximate to the bottom to the top of the litter box; and each grip of the plurality of grips comprising:

a rope having a first end and a second end, the first end being attached to the panel, the rope being extensible through a respective slot; and a knob being attached to the ropes and spaced from the first end such that the knob is positioned externally to the litter box upon positioning of the mat in the litter box, the knob and the second end of the rope define a terminal section of the rope, the terminal section comprising a tassel.

2. The pet waste management system of claim 1, wherein the fibers of the plurality of fibers are absorbent, wherein the plurality of fibers is configured for absorbing the liquid bodily waste.

3. The pet waste management system of claim 1, wherein:

the pad comprises fabric, sponge, or foamed elastomer; and the plurality of fibers comprises cotton, bamboo, or microfibers, wherein the mat is configured for being laundered.

4. A pet waste management system comprising:

a litter box having a bottom, a top, and a sidewall extending from the bottom to the top, the top being open; and a pet waste management device comprising a mat, the mat comprising:

a panel having an upper face, a lower face, and a perimeter, the panel selectively and substantially covering the bottom of the litter box, the panel being impermeable to liquid bodily waste excreted by a pet;

a pad being attached to the upper face of the panel, the pad being absorbent wherein the pad is configured for absorbing the liquid bodily waste excreted by the pet;

a plurality of fibers being attached to the panel and extending through the pad, wherein the plurality of fibers is configured for providing excretion promoting tactile sensations to the pet;

wherein the mat is configured for absorbing the liquid bodily waste and for collecting solid bodily waste, positioning a user to remove the mat from the litter box, to dispose of the solid bodily waste, and to launder the mat prior to reuse;

a grip being attached to the panel proximate to the perimeter of the panel, wherein the grip is configured for being grasped in digits of a hand of a user for removing the mat from the litter box;

wherein the litter box is cuboid and the sidewall defines four side edges;

wherein the panel is rectangular and has corners;

wherein the grip is one of a plurality of grips, each grip being attached to the panel proximate to a respective corner of the panel such that each corner has a grip attached proximate thereto;

a plurality of slots, each slot extending upwardly into a respective side edge of the sidewall from proximate to the bottom to the top of the litter box; and each grip comprising:

a rope having a first end and a second end, the first end being attached to the panel, the rope being extensible through a respective slot; and a knob being attached to the rope and spaced from the first end such that the knob is positioned externally to the litter box upon positioning of the mat in the litter box.

5. The pet waste management system of claim 4, wherein the knob and the second end of the rope define a terminal section of the rope, the terminal section comprising a tassel.

* * * * *